(12) United States Patent
Driemel et al.

(10) Patent No.: US 7,067,094 B2
(45) Date of Patent: Jun. 27, 2006

(54) PROCESS FOR THE BRIGHTENING OF SODIUM HYDROGENSULFATE

(75) Inventors: Klaus Driemel, Duisburg (DE); Ingo Biertümpel, Düsseldorf (DE); Horst Kirsch, Villmar (DE)

(73) Assignee: Grillo-Werke AG, Duisburg (DE)

( * ) Notice: Subject to any disclaimer, the term of this patent is extended or adjusted under 35 U.S.C. 154(b) by 0 days.

(21) Appl. No.: 10/928,705

(22) Filed: Aug. 30, 2004

(65) Prior Publication Data
US 2005/0089469 A1 Apr. 28, 2005

(30) Foreign Application Priority Data
Sep. 9, 2003 (DE) ................ 103 41 460

(51) Int. Cl.
*C01D 5/02* (2006.01)

(52) U.S. Cl. .................. 423/264; 423/520; 423/552

(58) Field of Classification Search ................ 423/264, 423/275, 265, 520, 552, 551
See application file for complete search history.

(56) References Cited

U.S. PATENT DOCUMENTS

| 1,104,913 | A | * | 7/1914 | Loeffler | ................ 423/520 |
| 1,599,996 | A | * | 9/1926 | Fritz | ............... 510/441 |
| 2,861,868 | A | * | 11/1958 | Stites, Jr. et al. | ........... 423/520 |
| 2,893,836 | A | * | 7/1959 | Davis et al. | ................ 423/520 |
| 3,690,825 | A | * | 9/1972 | Ott | ............................. 423/264 |
| 3,919,401 | A | * | 11/1975 | Chay | ......................... 423/520 |

FOREIGN PATENT DOCUMENTS

| DE | 28 10 693 | * | 9/1979 |
| GB | 110405 | * | 10/1917 |
| GB | 1 584 702 | * | 2/1981 |
| GB | 1 584 703 | * | 2/1981 |
| GB | 1 584 704 | * | 2/1981 |

OTHER PUBLICATIONS

DERWENT Abstract accession No. 1977-67005Y, for DE 2619811, published Sep. 1977.*

* cited by examiner

*Primary Examiner*—Stanley S. Silverman
*Assistant Examiner*—Ardith E. Hertzog
(74) *Attorney, Agent, or Firm*—Jacobson Holman PLLC

(57) ABSTRACT

The process for the brightening of continuously produced sodium hydrogensulfate obtained in the reaction of sodium chloride and concentrated sulfuric acid in molten sodium hydrogensulfate in a circulation reactor, wherein evolved hydrogen chloride and heating gases generated by an immersion burner are withdrawn at various sites and seed crystals are added for a faster conversion of initially formed metastable phases, is that from 0.01 to 0.05% by weight of aluminium oxide and/or from 0.5 to 1.5% by weight of magnesium oxide and/or magnesium sulfate and, optionally, additionally calcium sulfate are added as seed crystals.

4 Claims, No Drawings

PROCESS FOR THE BRIGHTENING OF SODIUM HYDROGENSULFATE

The subject matter of the present invention is a process for the brightening of continuously produced sodium hydrogensulfate obtained in the reaction of sodium chloride and concentrated sulfuric acid in molten sodium hydrogensulfate in a circulation reactor, wherein evolved hydrogen chloride and heating gases generated by an immersion burner are withdrawn at various sites and seed crystals are added for a faster conversion of initially formed metastable phases.

Such a process has been performed for many years in a Hoechst AG plant. This plant corresponds to DE C 2810693. The process corresponds to example 5 of DE C 2619811. Hence, in the practice calcium sulfate in amounts of up to 2.5% by weight is added to the sodium hydrogensulfate melt flowing off the reactor.

The so obtained product has an unobjectionable quality and has been marketed with this quality for years. In the meantime, Applicant produces and markets this sodium hydrogen sulfate.

In principle, this product may also be used in food industry. However, the product's yellow hue is considered disagreeable.

Detailed investigations of Applicant showed that this yellow hue can be assigned to traces of iron salts in contents of from 50 to 200 ppm.

All attempts to eliminate this discolouration by adding oxidants and reducing or complexing agents failed. Although the colour tone of the yellow colouring may be changed somewhat by such additions, it cannot be eliminated.

Now, additional detailed investigations resulted in the surprising finding that sodium hydrogensulfate continuously produced according to the above-mentioned process can be brightened if from 0.01 to 0.05% by weight of aluminium oxide and/or from 0.5 to 1.5% by weight of magnesium oxide and/or magnesium sulfate and, optionally, additionally calcium sulfate are added as seed crystals.

Although DE 26 19 811 mentions that from 0.1 to 5% by weight of magnesium sulfate may also be used as seed crystals, the fact that a product lacking the unwanted yellow colouration is formed with the use of only from 0.5 to 1.5% by weight of magnesium sulfate alone or with the addition of calcium sulfate was obviously not observed at that time.

Furthermore, it has been observed that similar results will be obtained if from 0.01 to 0.05% by weight of aluminium oxide and/or from 0.5 to 1.5% by weight of magnesium oxide are used. Optionally, also in these cases calcium sulfate may additionally be used.

Initially, these results were completely surprising and can perhaps later be explained by the fact that seed crystals used according to the invention are capable of preferably integrating iron salt impurities which are present only in traces into a colourless crystal lattice such that the bulk of the produced sodium hydrogensulfate is obtained in a practically colourless state. Calcium sulfate, which has always been used in the industrial scale to date, is obviously not capable of achieving this, however, its presence does not interfere with the brightening using aluminium oxide, magnesium oxide or magnesium sulfate according to the invention.

The process of the invention will be explained in more detail in the following examples.

EXAMPLE 1

Prior Art

In a bricked circulation reactor, which was directly heated by an immersion burner, 1770 l of technical sulfuric acid (d=1.84) and 1933 kg of common salt were charged into molten sodium hydrogensulfate every hour. The temperature of the sodium hydrogensulfate melt was maintained at 260° C. by burning 300 m³/h of hydrogen and 1000 m³/h of air in the immersion burner. After the addition of 100 l/h of water, 1 kg of calcium sulfate was added to the melt withdrawn from the reactor towards the pump receiver of the spray tower. The hitherto known sodium hydrogensulfate was formed which, however, is yellowish coloured.

EXAMPLE 2

Instead of 1 kg of calcium sulfate, 1 kg of $Al_2O_3$ (0.025% of Al, based on $NaHSO_4$) was added. In the spray tower the melt was atomized by injecting air to yield drops, which then solidified to nearly white pearls.

EXAMPLE 3

The process of example 1 was employed, however, instead of 1 kg of calcium sulfate 20 kg of water-free magnesium sulfate (corresponding to 0.2% of magnesium, based on sodium hydrogen sulfate) was added. Again, nearly white pearls were formed.

EXAMPLE 4

The process of example 3 was repeated, however, instead of 20 kg of water-free magnesium sulfate the same amount of magnesium oxide was added. Again, nearly white pearls were obtained.

The products of examples 2 to 4 meet the purity requirement for sodium hydrogensulfate as food additive. Due to the achieved brightening, the consumer in food industry considers them better acceptable.

The invention claimed is:

1. In a process for continuously producing sodium hydrogensulfate comprising
    reacting sodium chloride and concentrated sulfuric acid in molten sodium hydrogensulfate in a circulation reactor,
    withdrawing evolved hydrogen chloride and heating gases generated by an immersion burner at various sites, and
    adding seed crystals for a faster conversion of initially formed metastable phases, characterized in that the improvement comprises brightening the continuously produced sodium hydrogensulfate ($NaHSO_4$) by
    adding, based on the weight of the $NaHSO_4$, (i) from 0.01 to 0.05% by weight of aluminium oxide and/or (ii) from 0.5 to 1.5% by weight of magnesium oxide and/or (iii) from 0.5 to 1.5% by weight of magnesium sulfate as seed crystals.

2. The process of claim 1, characterized in that brightening the continuously produced sodium hydrogensulfate is by adding (i) the 0.01 to 0.05% by weight of aluminium oxide and (ii) the 0.5 to 1.5% by weight of magnesium oxide and (iii) the 0.5 to 1.5% by weight of magnesium sulfate as seed crystals.

3. The process of claim 2, characterized in that the improvement further comprises brightening the continuously produced sodium hydrogensulfate by adding (iv) calcium sulfate as seed crystals.

4. The process of claim 1, characterized in that the improvement further comprises brightening the continuously produced sodium hydrogensulfate by adding (iv) calcium sulfate as seed crystals.

* * * * *